United States Patent
Fukuda

[19]

[11] Patent Number: 6,015,036
[45] Date of Patent: Jan. 18, 2000

[54] ELECTRICAL SHIFT CONTROL DEVICE FOR A BICYCLE TRANSMISSION

[75] Inventor: Masahiko Fukuda, Amagasaki, Japan

[73] Assignee: Shimano, Inc., Osaka, Japan

[21] Appl. No.: 09/004,615

[22] Filed: Jan. 8, 1998

[30] Foreign Application Priority Data

Jan. 4, 1997 [JP] Japan ................................. 9-017301

[51] Int. Cl.$^7$ .................................................. B62M 25/08
[52] U.S. Cl. .................................... 192/217; 192/226
[58] Field of Search ................................. 192/217, 226; 474/78, 80, 82; 280/238, 261; 200/61.87, 61.91; 74/473.12, 473.13

[56] References Cited

U.S. PATENT DOCUMENTS

| | | |
|---|---|---|
| 4,071,892 | 1/1978 | Genzling . |
| 4,143,557 | 3/1979 | Wakabe et al. ............................ 474/80 |
| 4,946,425 | 8/1990 | Buhlmann ............................ 280/238 X |
| 5,358,451 | 10/1994 | Lacombe et al. ........................... 474/78 |
| 5,480,356 | 1/1996 | Campagnolo ........................ 474/80 X |
| 5,494,307 | 2/1996 | Anderson ............................... 474/80 X |
| 5,514,041 | 5/1996 | Hsu ........................................... 474/78 |
| 5,728,017 | 3/1998 | Bellio et al. ........................... 474/80 X |

FOREIGN PATENT DOCUMENTS

| | | |
|---|---|---|
| 0 558 425 A1 | 9/1993 | European Pat. Off. . |
| 4022473 A1 | 1/1992 | Germany . |
| 19608088 A1 | 12/1996 | Germany . |
| 5-338581 | 12/1993 | Japan . |

OTHER PUBLICATIONS

European Search Report for EP 98300185.0, dated May 5, 1998.

*Primary Examiner*—Richard M. Lorence
*Attorney, Agent, or Firm*—James A. Deland

[57] ABSTRACT

An electrical shift control device for a bicycle includes a brake lever adapted to move relative to a handlebar and a first electrical shift control switch supported to the brake lever. A second electrical shift control switch may be disposed in proximity to the brake lever, wherein the first electrical shift control switch may be used to operate the shifting mechanism to move in the upshifting direction, and wherein the second electrical shift control switch may be used to operate the shifting mechanism to move in the downshifting direction.

18 Claims, 5 Drawing Sheets

ELECTRICAL SHIFT CONTROL DEVICE FOR A BICYCLE TRANSMISSION

BACKGROUND OF THE INVENTION

The present invention is directed to control devices for bicycle transmissions and, more particularly, to an electrical shift control device for a bicycle transmission.

In the past, the operating force applied by the fingers to a shift control lever was transmitted to the drive component of a bicycle shifting mechanism by a cable that was fixed at one end to the control lever. More recently, electric switches mounted on the handlebar have been used instead of control levers in order to operate the bicycle shifting mechanism. For example, as shown in Japanese Laid-Open Patent Application 5-338581 and U.S. Pat. No. 5,358,451, a plurality of electric switches may be provided to a plurality of handlebar locations in order to allow for quicker shifts and to enhance responsiveness. However, the operation of the shifter and the operation of the brakes are often related to one another, and it is often inconvenient to move the hands around the handlebar to operate the brakes and then shift the bicycle transmission.

SUMMARY OF THE INVENTION

The present invention is directed to an electrical shift control device for a bicycle that allows the rider to carry out braking and shifting operations more quickly by mounting the electrical control switches in proximity to the brake lever used to operate the brakes. In one embodiment of the present invention, an electrical shift control device for a bicycle includes a brake lever adapted to move relative to a handlebar and a first electrical shift control switch supported to the brake lever. A second electrical shift control switch may be disposed in proximity to the brake lever, wherein the first electrical shift control switch may be used to operate the shifting mechanism to move in the upshifting direction, and wherein the second electrical shift control switch may be used to operate the shifting mechanism to move in the downshifting direction.

In a more specific embodiment, the first electrical shift control switch and the second electrical shift control switch are coupled for integral movement between a first position, a second position, and an intermediate position between the first position and the second position. A biasing mechanism can be provided for biasing the first electrical shift control switch and the second electrical shift control switch to the intermediate position. A third electrical shift control switch also can be disposed in proximity to the brake lever, wherein the third electrical shift control switch is spaced apart from the second electrical shift control switch and can be used to operate the shifting mechanism to move in the downshifting direction. The second electrical shift control switch may be mounted on a brake lever bracket in adjacent to the brake lever, and the third electrical shift control switch may be mounted on the brake lever bracket adjacent to the handlebar. In this case, upshifting events may be performed when the rider's hand is operating the brake lever, and downshifting events may be performed when the rider's hand is located on the handlebar or the brake lever bracket

DETAILED DESCRIPTION OF THE EMBODIMENTS

Figure 1:
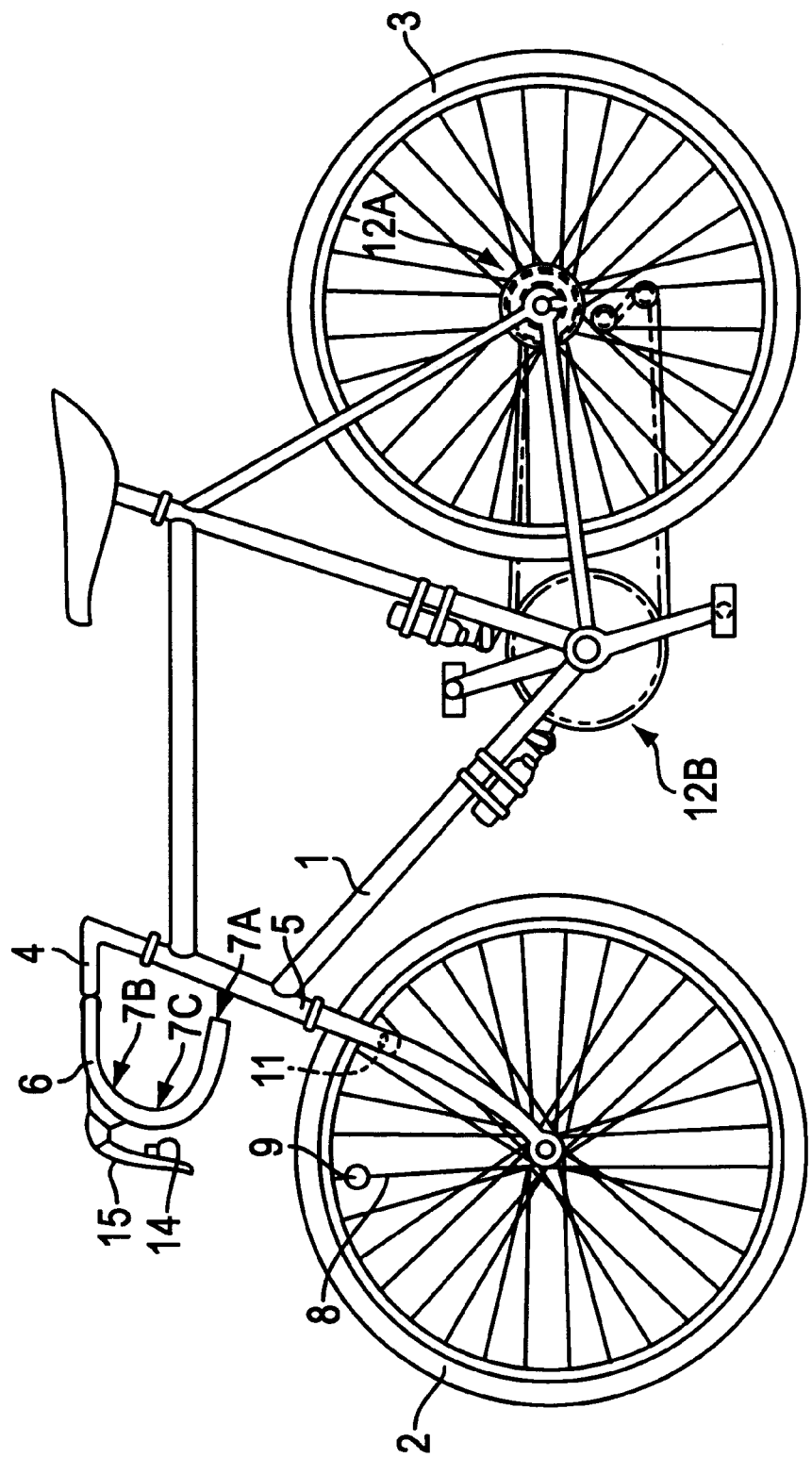
FIG. 1 is a side view of a bicycle that includes a particular embodiment of an electrical shift control device according to the present invention.

FIG. 1 is a side view of a bicycle that includes a particular embodiment of an electrical shift control device according to the present invention. The bicycle comprises a chassis frame 1, a front wheel 2 and rear wheel 3 that support the chassis frame 1, a handlebar frame 4, and so on. The handlebar frame 4 is provided integrally with a front wheel fork 5, and a handlebar 6 is provided as part of the handlebar frame. With a sport bicycle, a plurality of grips 7A, 7B and 7C are provided to a plurality of locations on the handlebar 6. There is no need to specify where the grips go on the handlebar.

A moving sensor 9 is attached to one of the spokes 8 of the front wheel 2, and a stationary sensor 11 is fixed to the chassis frame 1. The stationary sensor 11 is able to output a single electrical pulse while the moving sensor 9 makes one revolution so that the periodic function sequence of the wheel may be determined by these sensors in a well known manner. Thus, the method by which this is determined will not be described here. The proper shift step is determined from this periodic function sequence by a computer. The bicycle electric shifting mechanism pertaining to the present invention is particularly effective when used as the actuation switch for such an automatic shifting mechanism.

An external shifting mechanism is provided to the chassis frame 1. The shifting mechanism comprises a rear axle shifting mechanism 12A and a crank spindle shifting mechanism 12B. The shifting mechanism is a known, common mechanism that includes a derailleur.

A shift command electric switch 14 is provided at a suitable location on the bicycle. In this embodiment, a suitable location is the brake lever 15 that moves with respect to the handlebar. The brake lever 15 is located ahead of the grip 7C so that the grip 7C and the brake lever 15 can be gripped simultaneously with just one hand.

Figure 2:
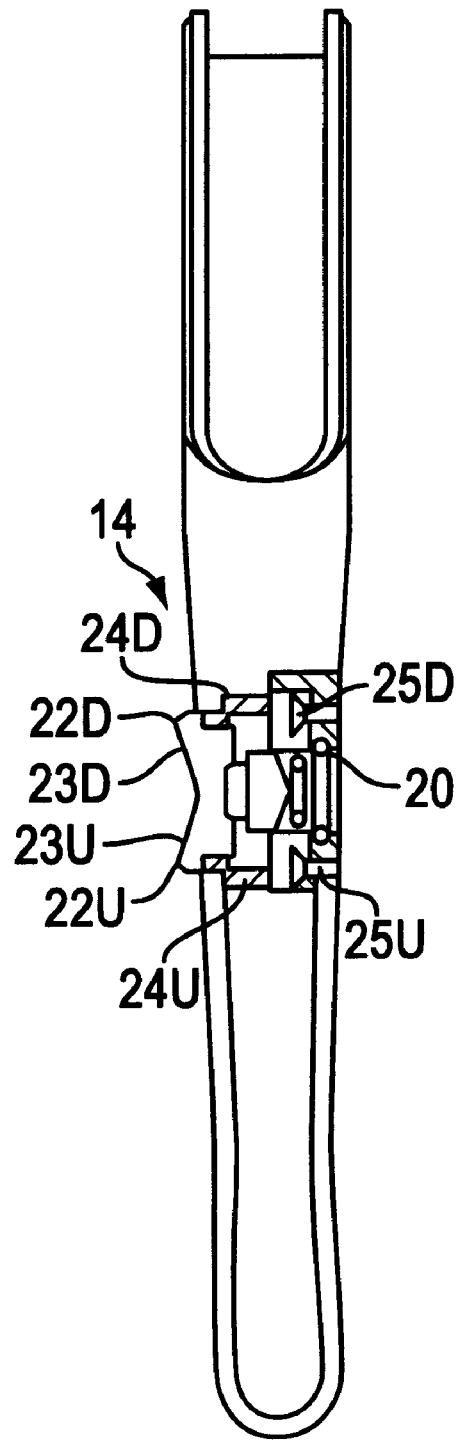
FIG. 2 is a partial cross sectional view of a particular embodiment of an electrical shift control device according to the present invention.
Figure 3:
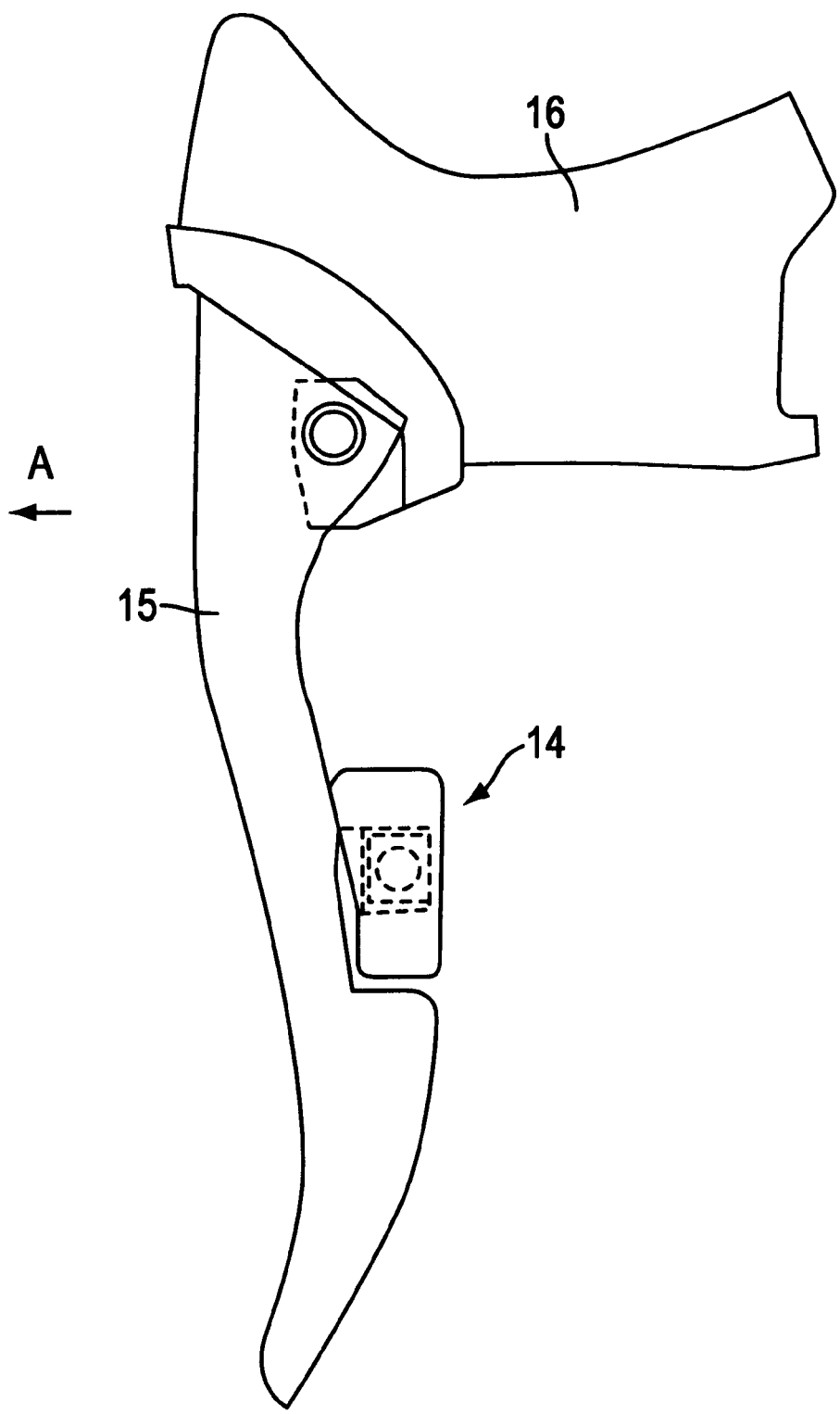
FIG. 3 is a side view of the device shown in FIG. 2.

FIGS. 2 and 3 are detailed illustrations of the positional relation between the brake lever 15 and the electric switch 14. The direction in which the bicycle is traveling is indicated by the arrow A in FIG. 3. The brake lever 15 is attached to the handlebar (not shown in FIGS. 2 and 3) via an attachment component 16. The attachment component 16 may be included in the handlebar. If we call the surface of the brake lever 15 that is ahead in the forward direction the front side, then the electric switch 14 is attached to the back side of the brake lever 15. The electric switch 14 comprises toggling movable portions 22D and 22U, a return spring 20, moving electrical contacts 24D and 24U, and stationary electrical contacts 25D and 25U.

The toggling movable portions 22D and 22U are formed from two bulging portions that bulge out in both directions from the center (above and below). The suffixes D and U stand for downshift and upshift, respectively. The bulging portions 22D and 22U move in mutually opposite directions, and move reciprocally over an approximate arc. The upper bulging portion 22D has an upper inclined surface 23D, which is a pressing surface, and the lower bulging portion 22U has a lower inclined surface 23U, which is also a pressing surface. The surface of the finger comes into contact with these inclined surfaces. After the finger has been removed, the toggling movable portions 22D and 22U are able to return to the depicted middle position through the work of the spring 20.

The plane in which the upper bulging portion 22D and the lower bulging portion 22U are displaced is a vertical plane. This vertical plane is perpendicular to the forward direction A. The upper bulging portion 22D and the lower bulging portion 22U move roughly horizontally, in a direction approximately perpendicular to the forward direction.

The moving electrical contacts 24D and 24U are formed from an upper moving electrical contact 24D and a lower moving electrical contact 24U. The upper moving electrical contact 24D is fixed to the upper bulging portion 22D, and the lower moving electrical contact 24U is fixed to the lower bulging portion 22U. The stationary electrical contacts 25D and 25U are formed from an upper stationary electrical contact 25D and a lower stationary electrical contact 25U.

When the upper inclined surface 23D is pressed, the upper moving electrical contact 24D is connected with the upper stationary electrical contact 25D, and when the lower inclined surface 23U is pressed, the lower moving electrical contact 24U is connected with the lower stationary electrical contact 25U. A single connection such as this generates a single electrical signal.

The lower bulging portion 22U, the lower moving electrical contact 24U, and the lower stationary electrical contact 25U may be termed a first electric switch. Likewise, the upper bulging portion 22D, the upper moving electrical contact 24D, and the upper stationary electrical contact 25D may be termed a second electric switch. The first electric switch generates an electrical signal for actuating the shifting mechanisms 12A and 12B in the direction in which the gear is raised, and the second electric switch generates an electrical signal for actuating the shifting mechanisms 12A and 12B in the direction in which the gear is lowered. No electrical signal is generated in the middle position. Thus, a single electrical signal in the upshift direction raises the gear by one step, and a single electrical signal in the down-shift direction lowers the gear by one step.

In operation, the thumb rests against the grip 7C of the handlebar 6, and the other fingers go around the front of the brake lever 15, with the surface of the fingertip of one finger (the surface on the palm side) resting on the toggling movable portions of the switch 14. When this finger is moved slightly up and to the left (or right), the upper bulging portion 22D is pressed to the left (or right). When this finger is moved slightly down and to the left (or right), the lower bulging portion 22U is pressed to the left (or right). Thus, slight movement of just one finger raises or lowers the shift step. The shift step can be changed by two gears by pressing the toggling movable portions 22D or 22U twice.

Figure 4:
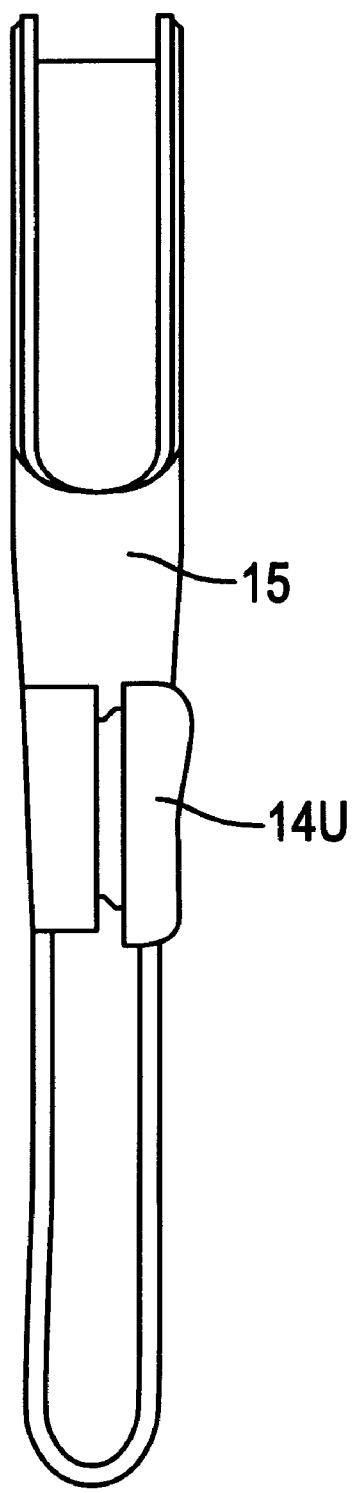
FIG. 4 is a front view of an alternative embodiment of an electrical shift control device according to the present invention.
Figure 5:
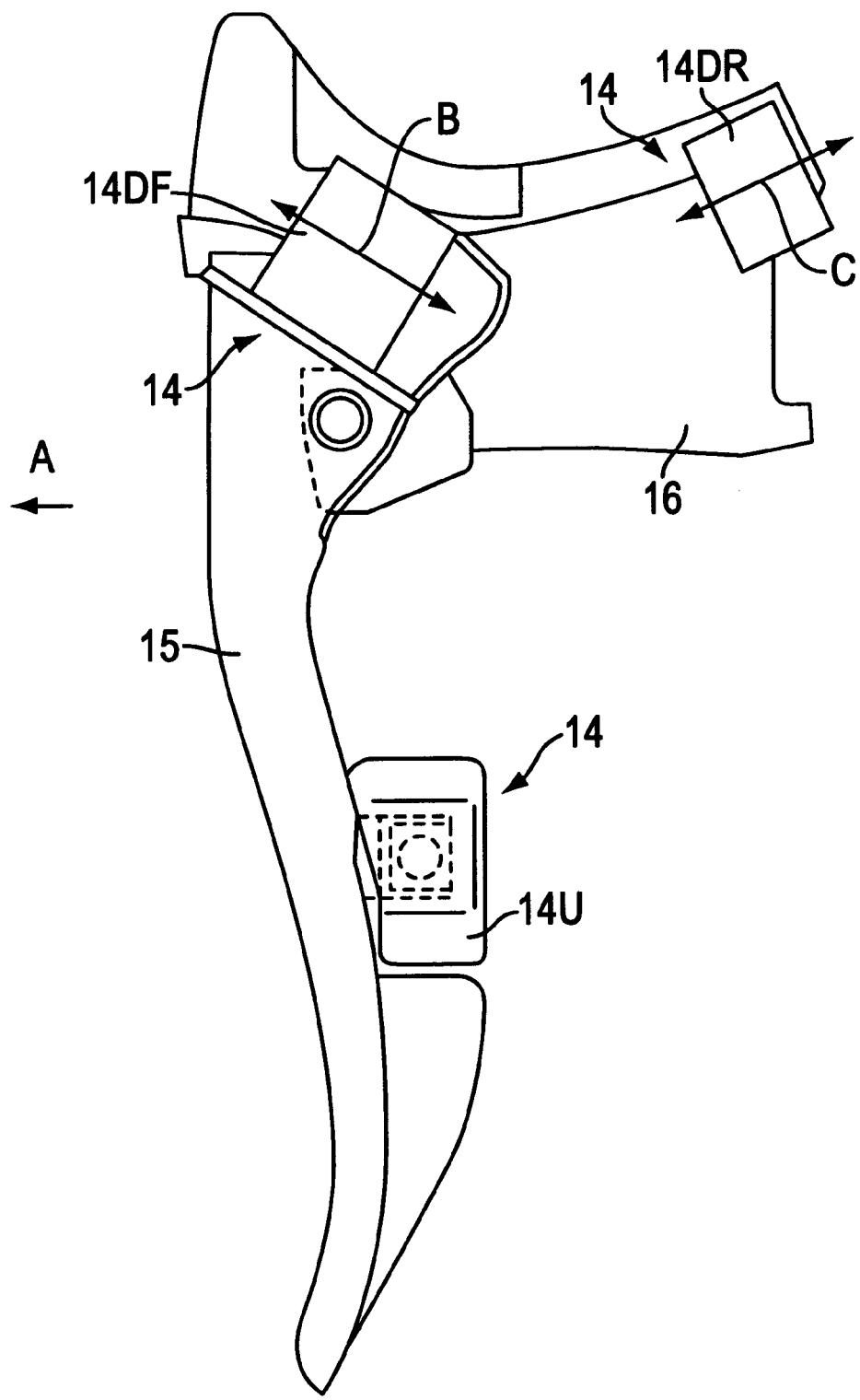
FIG. 5 is a side view of the device shown in FIG. 4.

FIGS. 4 and 5 are views of an alternative embodiment of an electrical shift control device according to the present invention. The fact that the electric switch 14 comprises a first electric switch and a second electric switch is the same as in the first embodiment, but this embodiment differs from the first embodiment in that the first electric switch is provided to the brake lever 15, and the second electric switch is not provided to the brake lever 15.

More specifically, the first electric switch is not formed as a toggle switch. Instead, a first electric switch 14U moves reciprocally in only one direction and generates an up-shift electrical signal. The fact that the movement plane is a vertical plane, and this vertical plane is perpendicular to the forward direction is the same as in the first embodiment. When the finger is removed, the first electric switch 14U returns to its home position and does not generate an electrical signal. The structure of the internal contacts will not be described.

Second and third electric switches 14DF and 14DR are provided to two different locations. The second electric switch 14DF is mounted on the front of the attachment component (brake lever bracket) 16 adjacent to and directly above the brake lever 15, and the third electric switch 14DR is mounted on the rear of the attachment component 16 adjacent to the handlebar 6.

As shown by the arrow B in FIG. 5, the movement direction of the movable component of the second electric switch 14DF lies in a vertical plane that includes the forward direction line and intersects the horizontal direction at an angle. Similarly, as shown by the arrow C in FIG. 5, the movement direction of the movable component of the third switch 14DR lies in a vertical plane that includes the forward direction line and intersects the horizontal direction at an angle.

The second electric switch 14DF and the third electric switch 14DR are positioned so that they can be easily pressed with the thumb of the hand firmly gripping the handlebar or the handlebar integral component. In this embodiment, the gear is lowered with the second and third electric switches just before the rider forcefully tries to transmit pedaling force to the crank in order to make a transition from a high speed state to another high speed state via a low speed state. Since two electric switches 14DF and 14DR are provided, the rider can execute a quick down-shift by selecting the switch that is closer to the portion of the handlebar gripped up to that point.

While the above is a description of various embodiments of the present invention, further modifications may be employed without departing from the spirit and scope of the present invention. For example, the size, shape, location or orientation of the various components may be changed as desired. The functions of one element may be performed by two, and vice versa.

The above description was primarily for a case in which the electric switch was used to change gears, but it can be used as a switch for actuating a shifting mechanism when the shift step decision is made automatically. Here again, the electric switch is provided to the handlebar as well, and not just to the brake lever, so the shifting can be carried out smoothly and quickly. When a plurality of two types of electric switches are provided, at least one of the first and second types of electric switches can be provided to the handlebar (including the bracket) or to the chassis frame that supports the riders body (the chassis frame that supports the crank spindle). Thus, the scope of the invention should not be limited by the specific structures disclosed. Instead, the true scope of the invention should be determined by the following claims.

What is claimed is:

1. An electrical shift control device for a bicycle transmission comprising:

a brake lever adapted to move relative to a handlebar;

a first electrical shift control switch mounted to the brake lever; and a second electrical shift control switch mounted to the brake lever.

2. An electrical shift control device for a bicycle transmission comprising:

a brake lever adapted to move relative to a handlebar;

a first electrical shift control switch supported to the brake lever; and a second electrical shift control switch supported to the brake lever;

wherein the first electrical shift control switch and the second electrical shift control switch are coupled for integral movement between a first position, a second position, and an intermediate position between the first position and the second position.

3. The device according to claim 2 further comprising a biasing mechanism for biasing the first electrical shift control switch and the second electrical shift control switch to the intermediate position.

4. An electrical shift control device for a bicycle transmission comprising:

a brake lever adapted to move relative to a handlebar;

a brake lever bracket for mounting the brake lever to the handlebar;

a first electrical shift control switch supported to the brake lever; and a second electrical shift control switch mounted to the brake lever bracket.

5. The device according to claim 4 further comprising:

a third electrical shift control switch mounted to the brake lever bracket.

6. The device according to claim 5 wherein the third electrical shift control switch is spaced apart from the second electrical shift control switch.

7. A device for shifting a bicycle transmission comprising:

a shifting mechanism that moves in an upshifting direction and a downshifting direction;

a brake lever adapted to move relative to a handlebar;

a first electrical shift control switch mounted to the brake lever for controlling the shifting mechanism; and a second electrical shift control switch mounted to the brake lever.

8. The device according to claim 3 wherein the first electrical shift control switch operates the shifting mechanism to move in the upshifting direction, and wherein the second electrical shift control switch operates the shifting mechanism to move in the downshifting direction.

9. A device for shifting a bicycle transmission comprising:

a shifting mechanism that moves in an upshifting direction and a downshifting direction;

a brake lever adapted to move relative to a handlebar;

a first electrical shift control switch supported to the brake lever for controlling the shifting mechanism; and a second electrical shift control switch supported to the brake lever;

wherein the first electrical shift control switch and the second electrical shift control switch are coupled for integral movement between a first position, a second position, and an intermediate position between the first position and the second position.

10. The device according to claim 9 further comprising a biasing mechanism for biasing the first electrical shift control switch and the second electrical shift control switch to the intermediate position.

11. A device for shifting a bicycle transmission comprising:

a shifting mechanism that moves in an upshifting direction and a downshifting direction;

a brake lever adapted to move relative to a handlebar;

a brake lever bracket for mounting the brake lever to the handlebar; and a first electrical shift control switch mounted to the brake lever; and a second electrical shift control switch mounted to the brake lever bracket.

12. The device according to claim 11 further comprising:

a third electrical shift control switch mounted to the brake lever bracket.

13. The device according to claim 12 wherein the third electrical shift control switch is spaced apart from the second electrical shift control switch.

14. The device according to claim 12 wherein the first electrical shift control switch operates the shifting mechanism to move in the upshifting direction, wherein the second electrical shift control switch operates the shifting mechanism to move in the downshifting direction, and wherein the third electrical shift control switch operates the shifting mechanism to move in the downshifting direction.

15. An electrical shift control device for a bicycle transmission comprising:

a brake lever adapted to move relative to a handlebar;

a first electrical shift control switch mounted to the brake lever; and wherein the first electrical shift control switch includes a first finger contacting surface that extends laterally outwardly from a lateral side of the brake lever.

16. The shift control device according to claim 15 further comprising:

a second electrical shift control switch mounted to the brake lever; and wherein the second electrical shift control switch includes a second finger contacting surface that extends laterally outwardly from the lateral side of the brake lever.

17. The device according to claim 16 wherein the first electrical shift control switch and the second electrical shift control switch are coupled for integral movement between a first position, a second position, and an intermediate position between the first position and the second position.

18. The device according to claim 17 further comprising a biasing mechanism for biasing the first electrical shift control switch and the second electrical shift control switch to the intermediate position.

* * * * *